Patented May 12, 1936

2,040,123

UNITED STATES PATENT OFFICE 2,040,123

SEPARATION OF DINITROBENZENE ISOMERS

Harold W. Coward, Kenmore, N. Y., assignor to National Aniline & Chemical Company, Inc., New York, N. Y., a corporation of New York No Drawing. Application July 29, 1935, Serial No. 33,662

7 Claims. (Cl. 260—142)

This invention relates to the purification of meta-dinitrobenzene. It is particularly directed to a method for the separation or removal of isomeric dinitrobenzene from mixtures of meta-dinitrobenzene therewith.

Meta-dinitrobenzene prepared by the nitration of benzene or nitrobenzene normally contains on the order of 5% to 15% of isomeric dinitrobenzenes (o- and p-dinitrobenzene), the presence of which is in many instances undesirable. While it has been proposed to effect the purification of meta-dinitrobenzene by treatment thereof with a caustic alkali or an alkaline salt to form water or alkali-soluble reaction products from the isomers and separation of resultant solution from the solid meta compound, such treatments are not entirely effective because of the fact that the alkalis form with the isomeric dinitrobenzenes reaction products which are insoluble in aqueous alkaline solution as well as products which are soluble therein. In consequence a complete purification is not effected.

The present invention is based upon the discovery that by proper control of reaction conditions aqueous sulfite may be caused to react upon the ortho and para dinitrobenzenes in the presence of meta-dinitrobenzene without substantial reaction with the meta-dinitrobenzene and upon the further discovery that such products may be extracted from the meta-dinitrobenzene by means of water or alkaline solutions.

In accordance with the process of the present invention meta-dinitrobenzene in solid phase containing isomers associated therewith is subjected to the action of an aqueous sulfite, for example a water-soluble sulfite such as an alkali-metal or ammonium sulfite. In this manner substantially complete conversion of the isomers to water- or alkali-soluble products may be effected selectively without any substantial action on the meta-dinitrobenzene.

The duration of the sulfite reaction step may be regulated in accordance with the melting or setting point of the treated dinitrobenzene. Thus ordinary crude meta-dinitrobenzene may melt in the neighborhood of 80° C. As the reaction proceeds, the melting point rises until with substantially complete elimination of isomers the product has a melting point of 89.5 to 90.6° C. Further action of the sulfite may convert the meta-dinitrobenzene as well as its isomers to soluble products and accordingly it is desirable to discontinue the treatment as soon as a melting point of about 90° C. is obtained.

It is, of course, desirable that the reaction be carried out with the solid dinitrobenzene in very finely divided form. For obtaining a suspension or dispersion of the dinitrobenzene suitable for treatment in accordance with the present invention, a mixture of the crude dinitrobenzene and water may be heated to a temperature just slightly above the setting point of the dinitrobenzene. By rapid agitation and simultaneous rapid cooling of the liquid, thus causing the molten dinitrobenzene to solidify, an aqueous dispersion of the compound in the form of very fine crystals may be obtained. These fine crystals make possible intimate contact and a rapid and uniform reaction of the ortho and para compounds with the sulfite treating solution.

Suitable sulfites for effecting the present purification process are alkali-metal sulfites, for example sodium sulfite, sodium bisulfite, ammonium sulfite, or a sodium ammonium sulfite, or mixtures of such compounds, for instance sodium sulfite in admixture with sodium bisulfite, say a sulfite-bisulfite mixture containing from 25% to 60% bisulfite and the balance sulfite. The alkali-metal sulfites have been found to give results superior to those obtained using the ammonium sulfite and hence are employed in the preferred embodiment of my invention. The solution may be either neutral or alkaline during the purification reaction step. As the reaction proceeds the solution becomes alkaline or more alkaline as a result of the reaction of sulfite with ortho and para dinitrobenzene. Thus at the end of the reaction process the solution normally will be definitely alkaline. This condition is advantageous rather than otherwise since it promotes the solubility of the reaction products which probably are sulfonates or sulfites, the alkali-metal salts of which are especially soluble.

From the foregoing discussion it will be apparent that the entire reaction may be carried out in substantially neutral solution if desired. In such case it is advantageous to wash the product first with alkaline solution in order to increase the solubility of the reaction products.

The process of this invention may be effected with slurries of dinitrobenzene which contain widely variant amounts of water. Preferably the process is carried out with slurries which are fluid enough to be agitated easily and rapidly, and which contain a sufficient amount of water to hold in solution the quantity of water-soluble sulfite employed and the water-soluble compounds formed during the treatment. To attain these desirable conditions, it has been found preferable to adjust the amount of water in the reaction slurry of dinitrobenzene in aqueous sulfite solution to between about 1.5 and about 5 times the weight of the treated crude dinitrobenzene. If desired, part of the water may be replaced by alcohol and/or other organic, water-miscible solvents.

The sulfite solution reacts more rapidly as the temperature increases and I have found that the reaction may be effected conveniently at temperatures between 45 or 50° and 80° C. At temperatures above about 80 C. the reaction of sulfite upon the meta-dinitrobenzene as well as upon the ortho and para isomers becomes noticeable and the loss which results from this decomposition makes the use of higher temperatures undesirable. It has been found that the treatment has its optimum effectiveness if carried out between about 58° and about 63° C. At the optimum temperature the reaction is completed in a period of from 1 to 4 hours when applied to the usual crude meta-dinitrobenzene products.

As will be evident, the quantity of sulfite to be employed will vary depending upon the proportion of isomeric dinitrobenzene associated with the meta-dinitrobenzene and upon the particular sulfite employed. For the ordinary crude dinitrobenzene of 80° C. melting point containing isomers to the extent of 10% of the total crude product 15 to 20 parts by weight of normal sodium sulfite suffice for the purification of 100 parts by weight of the crude dinitrobenzene.

The invention is illustrated by the following examples, in which the quantities of materials employed are designated as parts by weight.

*Example I.*—400 parts of crude commercial meta-dinitrobenzene, which has a setting point of about 80° C. and contains substantial proportions of ortho and para dinitrobenzene, are suspended in 500 parts of water. The vigorously stirred mixture is heated to a temperature which is slightly above the melting point of the dinitrobenzene, e. g. about 85° C. The mixture is maintained at that temperature until all the dinitrobenzene is in a liquid state. It is then cooled below 80° C., say to about 60° C., whereby a fine crystalline dispersion of dinitrobenzene is produced. A previously prepared solution of 60 parts of sodium sulfite ($Na_2SO_3$) dissolved in 210 parts of water is added quickly to the agitated crystalline dispersion of dinitrobenzene in water. The resulting mixture is stirred vigorously for a period of two hours at a temperature of about 58° C. to about 63° C. It is then cooled rapidly to between 10° and 30° C., and the crystals of purified meta-dinitrobenzene are separated from the mixture by filtration or other suitable means. The crystals are washed with water until they are free from water-soluble salts. The washed meta-dinitrobenzene thus recovered is in the form of fine, faintly yellow crystals, which may be dried in any convenient manner. The dry meta-dinitrobenzene is very light yellow and has a setting point of 89.5° to 90° C. The yield of meta-dinitrobenzene is about 85% of the weight of crude dinitrobenzene from which it is derived.

*Example II.*—100 parts of technical crude meta-dinitrobenzene are suspended in 180 parts of water. The suspension is heated until the meta-dinitrobenzene is molten. It is then cooled rapidly to slightly below 45° C. 15 parts of solid sodium sulfite and 20 parts of solid sodium bisulfite are added quickly. The vigorously stirred mixture is warmed to a temperature between 58° C. and 63° C. and held at that temperature for two hours. The slurry is then cooled to between 10° C. and 30° C. The crystals of purified meta-dinitrobenzene are separated from the aqueous liquid by filtration, and are washed free of water-soluble impurities with cold water. The resulting purified meta-dinitrobenzene is dried in air. When dry, it has a melting point of 90.6° C. and weighs about 84% of the crude meta-dinitrobenzene from which it is derived.

*Example III.*—100 parts of technical crude meta-dinitrobenzene are suspended in 180 parts of water and the suspension is heated until the meta-dinitrobenzene is molten. The mixture is cooled rapidly below 45° C., and 15 parts of solid sodium sulfite and 6 parts of solid sodium bisulfite are added quickly thereto. The stirred mass is warmed to a temperature between 58° and 63° C., and is maintained at this temperature for about two hours. The mass is then cooled to between about 10° C. and about 30° C. The crystals of purified meta-dinitrobenzene are separated from the slurry by filtration, are washed free of water-soluble impurities with cold water, and are dried in air. The dry, purified meta-dinitrobenzene has a melting point of 90.0° C. and weighs about 86% of the weight of crude meta-dinitrobenzene from which it is derived.

I claim:

1. The method of removing isomeric dinitrobenzene from a mixture of meta-dinitrobenzene therewith, which comprises subjecting the dinitrobenzene mixture in solid phase to the action of an aqueous sulfite.

2. The method of removing isomeric dinitrobenzene from a meta-dinitrobenzene product containing the same, which comprises subjecting the meta-dinitrobenzene product to the action of an aqueous sulfite at a temperature between 45° and 80° C. for a period of time sufficient to effect reaction of isomeric dinitrobenzene but insufficient to effect reaction of a substantial proportion of the meta-dinitrobenzene.

3. The method of removing isomeric dinitrobenzene from a meta-dinitrobenzene product containing the same, which comprises subjecting the meta-dinitrobenzene product to the action of an aqueous sulfite at a temperature between 45° and 80° C. for a period of time sufficient to effect reaction of isomeric dinitrobenzene but insufficient to effect reaction of a substantial proportion of the meta-dinitrobenzene, and separating the reaction products as an alkaline solution thereof from the meta-dinitrobenzene.

4. The method of preparing meta-dinitrobenzene substantially free from its ortho and para isomers from a meta-dinitrobenzene product containing the same, which comprises subjecting the dinitrobenzene product to the action of an aqueous alkali-metal sulfite solution at a temperature between 45° and 80° C. for a period of time sufficient to effect reaction of isomeric dinitrobenzene but insufficient to effect reaction of a substantial proportion of the meta-dinitrobenzene.

5. The method of preparing meta-dinitrobenzene substantially free from its ortho and para isomers from a meta-dinitrobenzene product containing the same, which comprises subjecting the dinitrobenzene product to the action of an aqueous alkali-metal sulfite solution at a temperature between 50° and 80° C. until substantially all of said isomers are dissolved and separating the solution from the meta-dinitrobenzene before a substantial proportion thereof is dissolved.

6. The method of preparing meta-dinitrobenzene substantially free from its ortho and para isomers from a mixture of meta-dinitrobenzene product containing the same, which comprises subjecting the dinitrobenzene product to the action of an aqueous alkali-metal sulfite solution at a temperature between about 58° and about 63° C.

7. The method of purifying crude commercial dinitrobenzene, which comprises forming a mixture of the crude dinitrobenzene in liquid phase with water, cooling the mixture below the solidifying point of the dinitrobenzene to produce a fine crystalline slurry thereof and treating the slurry at a temperature between about 58° and about 63° C. with an alkaline sodium sulfite in aqueous solution until the melting point of the crystals when dried is approximately 90° C., and thereupon separating the solid crystals from the aqueous solution.

HAROLD W. COWARD.